US010613504B2

(12) United States Patent
Chowdhury

(10) Patent No.: US 10,613,504 B2
(45) Date of Patent: Apr. 7, 2020

(54) METHODS AND SYSTEMS FOR DETERMINING OCCUPANCY OF A ZONE IN A BUILDING

(71) Applicant: Feedback Solutions Inc., Mississauga (CA)

(72) Inventor: Chandan Chowdhury, Mississauga (CA)

(73) Assignee: Feedback Solutions Inc., Mississauga, ON (CA)

( * ) Notice: Subject to any disclaimer, the term of this patent is extended or adjusted under 35 U.S.C. 154(b) by 99 days.

(21) Appl. No.: 15/641,499

(22) Filed: Jul. 5, 2017

(65) Prior Publication Data

US 2018/0011463 A1 Jan. 11, 2018

Related U.S. Application Data

(60) Provisional application No. 62/358,302, filed on Jul. 5, 2016.

(51) Int. Cl.

| | |
|---|---|
| ***G05B 19/042*** | (2006.01) |
| ***G06F 17/30*** | (2006.01) |
| ***H04N 5/33*** | (2006.01) |
| ***G06F 16/903*** | (2019.01) |
| ***G06Q 10/10*** | (2012.01) |
| ***G07C 9/00*** | (2020.01) |
| ***G06T 7/70*** | (2017.01) |

(52) U.S. Cl.

CPC ... *G05B 19/0428* (2013.01); *G06F 16/90335* (2019.01); *G06Q 10/10* (2013.01); *G06T 7/70* (2017.01); *G07C 9/00* (2013.01); *H04N 5/33* (2013.01); *G05B 2219/2614* (2013.01); *G06T 2207/30196* (2013.01); *G06T 2207/30242* (2013.01)

(58) Field of Classification Search

CPC . G05B 19/0428; G06T 7/70; G06F 17/30979; G06Q 10/10; G07C 9/00; H04N 5/33

USPC .......................................................... 700/277

See application file for complete search history.

(56) References Cited

U.S. PATENT DOCUMENTS

| | | | | |
|---|---|---|---|---|
| 5,779,538 | A | 7/1998 | Jardinier | |
| 6,645,066 | B2 | 11/2003 | Gutta et al. | |
| 6,916,239 | B2 | 7/2005 | Siddaramanna et al. | |
| 2002/0134849 | A1 | 9/2002 | Disser | |
| 2007/0149109 | A1 | 6/2007 | Gu et al. | |
| 2007/0285510 | A1* | 12/2007 | Lipton | G08B 13/1961 348/135 |
| 2008/0277486 | A1 | 11/2008 | Seem et al. | |
| 2009/0143915 | A1 | 6/2009 | Dougan et al. | |

(Continued)

*Primary Examiner* — Mohammad Ali
*Assistant Examiner* — Joshua T Sanders
(74) *Attorney, Agent, or Firm* — Rowand LLP

(57) ABSTRACT

A device for determining normalized occupancy of one or more spaces in a building is disclosed. The device includes a memory and a processor coupled to the memory. The processor is configured to: poll one or more people counting sensors associated with access points to a defined region of the building to obtain counts data from the one or more people counting sensors for a specified time period and historical calibration data for the one or more people counting sensors; and process the counts data and the historical calibration data to determine a normalized occupancy of the defined region during the specified time period.

18 Claims, 3 Drawing Sheets

300
START
302 Receive request to determine occupancy
304 Trigger polling of counting sensors associated with access points
306 Retrieve counts data from sensors?
NO
YES
308 Process collected counts and historical calibration data for the counting sensors
310 Manage resources associated with the defined region based on normalized occupancy
312 Attempt to reconnect sensor
314 Sensor responsive?
YES
NO
316 Increment reconnect count
318 Reconnect count less than predefined value?
YES
NO
END

(56) References Cited

U.S. PATENT DOCUMENTS

| | | | | |
|---|---|---|---|---|
| 2010/0235004 | A1* | 9/2010 | Thind | G05B 15/02 700/277 |
| 2011/0189938 | A1 | 8/2011 | Yoshii et al. | |
| 2014/0079282 | A1* | 3/2014 | Marcheselli | G06K 9/00335 382/103 |
| 2014/0277757 | A1* | 9/2014 | Wang | G05D 23/1927 700/276 |
| 2017/0322577 | A1* | 11/2017 | Al-Mohssen | G05F 1/66 |
| 2017/0347264 | A1* | 11/2017 | Holland | H04W 12/06 |

* cited by examiner

METHODS AND SYSTEMS FOR DETERMINING OCCUPANCY OF A ZONE IN A BUILDING

RELATED APPLICATION

This application claims priority to U.S. Provisional Patent Application No. 62/358,302 filed on Jul. 5, 2016, which is incorporated herein by reference.

TECHNICAL FIELD

The present disclosure relates to building occupancy and, in particular, to methods and systems for determining occupancy of defined regions in a building.

BACKGROUND

People counting technology is used to measure the number and direction of people traversing a certain passage or entrance. Various different technologies have been used in people counting systems, such as infrared beams, thermal imaging and video imaging. Accurate and reliable counts of people in defined regions of a building can facilitate making informed decisions regarding management of building utilities, space planning, staff scheduling, retail analytics, and space and energy usage optimization.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
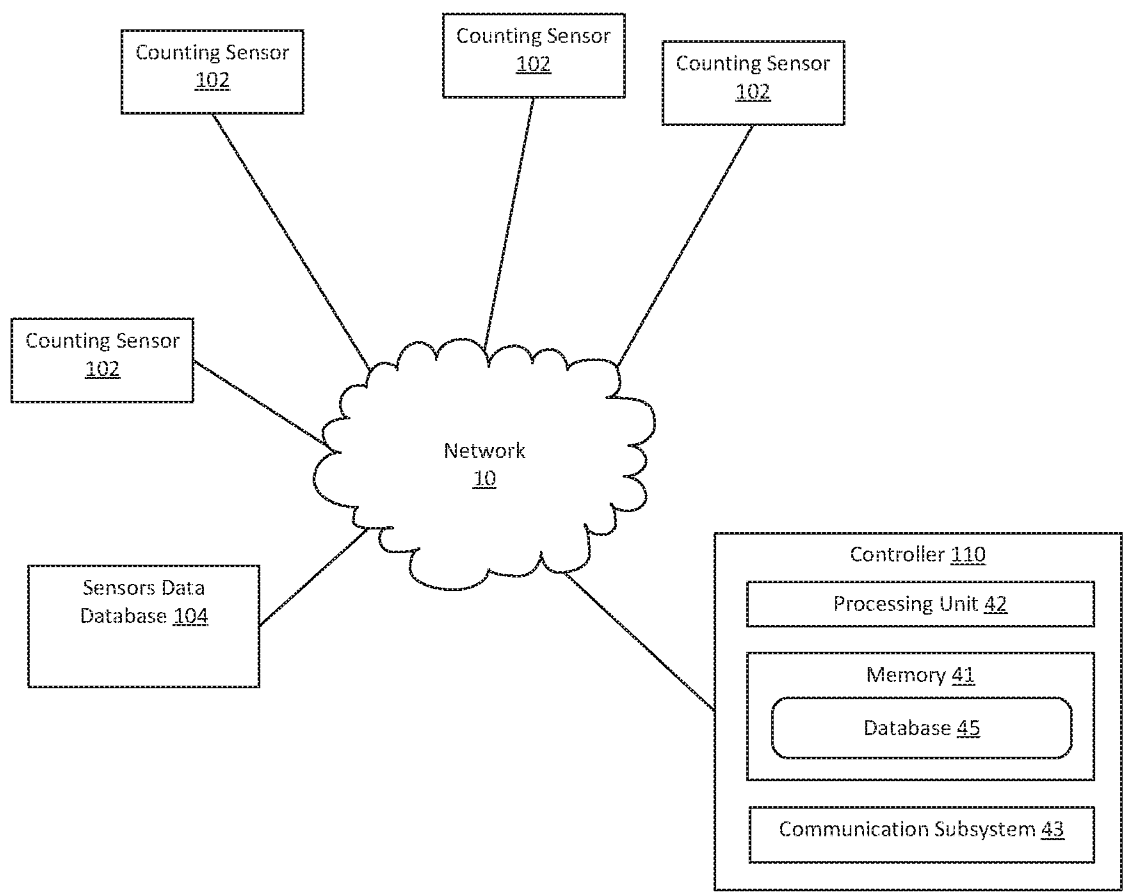
FIG. 1 diagrammatically shows an example system for determining normalized occupancy of spaces in a building, in accordance with example embodiments of the present disclosure.

In an aspect, the present disclosure describes a system for determining normalized occupancy of one or more spaces in a building. The system includes: one or more sensors installed throughout the building, the one or more sensors including, for each of a plurality of defined regions in the building, at least one people counting sensor positioned near one or more access points to the defined region, wherein the at least one people counting sensor is configured to store, in a database, counts of entries into and exits from the defined region via a respective access point for a plurality of time periods, and a controller communicably coupled to each of the one or more sensors. The controller is configured to: poll one or more people counting sensors associated with access points to a defined region of the building to obtain counts data from the one or more people counting sensors for a specified time period and historical calibration data for the one or more people counting sensors; and process the counts data and the historical calibration data to determine a normalized occupancy of the defined region during the specified time period.

In another aspect, the present disclosure describes a device for determining normalized occupancy of one or more spaces in a building. The device includes: a memory and a processor coupled to the memory. The processor is configured to: poll one or more people counting sensors associated with access points to a defined region of the building to obtain counts data from the one or more people counting sensors for a specified time period and historical calibration data for the one or more people counting sensors, the one or more people counting sensors including at least one sensor positioned near each access point to the defined region, wherein each people counting sensor is configured to store, in a database, counts of entries into and exits from the defined region via a respective access point for a plurality of time periods; and process the counts data and the historical calibration data to determine a normalized occupancy of the defined region during the specified time period.

In yet another aspect, the present disclosure describes a method for managing resources associated with one or more spaces in a building. The method includes: polling one or more people counting sensors associated with access points to a defined region of the building to obtain counts data from the one or more people counting sensors for a specified time period and historical calibration data for the one or more people counting sensors, the one or more people counting sensors including at least one sensor positioned near each access point to the defined region, wherein each people counting sensor is configured to store, in a database, counts of entries into and exits from the defined region via a respective access point for a plurality of time periods; processing the counts data and the historical calibration data to determine a normalized occupancy of the defined region during the specified time period; and managing resources associated with the defined region based on the normalized occupancy of the defined region.

Other example embodiments of the present disclosure will be apparent to those of ordinary skill in the art from a review of the following detailed descriptions in conjunction with the drawings.

In the present application, the term "access point" refers to a point of entry into and/or exit from a defined region in a building. More specifically, an access point may be a doorway, gate, passage, etc. which defines an opening that allows access to a defined region, such as a room or floor/level of a building. An access point may demarcate a boundary between adjacent spaces or regions in a building. For example, an access point to a floor (i.e. level) in a building may be a set of doors which separate a stairway leading to the floor from the space (e.g. hallway, rooms, etc.) occupied by the floor. It will be understood that an access point may be used for both entering a defined region and for exiting from the defined region. As used herein, the term "access point" will refer only to those doorways, gates, passages, etc. which allow traditional access to a defined region. In particular, the term "access point" is not intended to encompass those apertures (e.g. windows, air vents, etc.) that are not used for traditional entry into and/or exit from a defined region. It will also be understood that a defined region of a building may have multiple access points which provide simultaneous access to the defined region.

In the present application, "occupancy" of a defined region in a building is intended to refer to a number of people occupying the defined region. Occupancy values can be determined for one or more rooms, floors/levels, or any other defined zones in a building. Occupancy of a space may be determined at a specific point in time (e.g. real-time) or during a certain time interval. In particular, each occupancy value for a defined region has an associated time or time interval.

In the present application, the term "space" refers to defined areas of a building that may be occupied by people. For purposes of occupancy determination, a "space" may comprise a single defined area delimited by boundaries (e.g. walls, doors, etc.) or multiple regions/zones (e.g. rooms, corridors, etc.) in a building that are connected and/or grouped together for occupancy consideration. A "space" may alternatively be defined by the access points which allow entry into and exit from the "space". In particular, the regions in a building that make up a "space" can be completely determined by specifying the access points (e.g. a main entrance to a multi-office space, etc.) that provide access to the "space".

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Determining occupancy information (e.g. real-time occupancy) for defined regions of a building can be useful for achieving various efficiencies in managing resources associated with the building. In particular, data collected by sensors installed throughout a building can be compiled and analyzed to derive occupancy values for certain regions of the building. While the use of sensors, such as people counting sensors, can obviate the need for manually counting the number of persons occupying a defined space, exclusive reliance on sensor data can sometimes lead to erroneous estimates of occupancy. For example, a defined space having multiple different access points may have a plurality of counting sensors associated with the space. Counting errors in one or more of these sensors can be propagated to final calculation of occupancy, resulting in inaccurate or implausible occupancy values (e.g. a non-zero value at the end of a day, negative occupancy at certain time periods, etc.).

The present disclosure describes systems and methods for determining normalized occupancy of spaces in a building. A normalized occupancy of a space may provide a more accurate indication of the actual number of people occupying the space at any given time. Additionally or alternatively, the present disclosure provides a method of calibrating and/or adjusting people counting sensors that are installed throughout a building premises. Specifically, a controller that is communicably connected to a plurality of people counting sensors for receiving counts data therefrom may be configured to determine the accuracy and/or validity of data retrieved from one or more of the people counting sensors. The controller may, for example, be configured to monitor the counts data received from and status associated with the respective people counting sensors and reset or request to reset one or more connected people counting sensors upon determining that the received counts data indicate a possibility of error.

Reference is now made to FIG. 1, which is a schematic diagram illustrating an example system 100 for determining normalized occupancy of spaces in a building 101 (not shown in FIG. 1). The system 100 may be suitable for implementation in a number of different indoor facilities, such as shopping malls, commercial office and government buildings, museums, libraries, and university campus buildings. The system 100 is connected to a network 10. The network 10 may include one or more wired or wireless communication networks, or combinations of both. For example, the network 10 may be a Wireless Local Area Network (WLAN) that conforms to the IEEE 802.11 standards (sometimes referred to as Wi-Fi). In at least some embodiments, the network 10 may be an Internet Protocol (IP)-based network.

The system 100 includes one or more people counting sensors 102 installed throughout the building 101. The people counting sensors 102 are used to count the number of people passing through a passage or an access point of a defined region in the building 101. The people counting sensors 102 may implement any one of a number of different technologies for detecting movements of people, such as, but not limited to, infrared beams, thermal imaging, computer vision (e.g. video-based counting), and Wi-Fi counting. In some embodiments, the people counting sensors 102 may be thermal imaging sensors which operate based on detecting human infrared radiation. For example, at least one of the people counting sensors 102 may be the Gazelle DualView™ People Counter provided by Infrared Integrated Systems (Irisys) Inc. Other types of sensors may be suitable for use as people counting sensors 102. The people counting sensors 102 are connected to the network 10 and are configured for communication over the network 10.

The people counting sensors 102 are installed throughout the building 101 to facilitate counting of people entering or leaving one or more defined regions in the building 101. More specifically, for each of a plurality of defined regions in the building 101, at least one people counting sensor 102 is positioned near or at one or more of the access points to the defined region. For example, a people counting sensor 102 may be installed in the ceiling of a room, near an access point of the room (i.e. within a predetermined distance (e.g. between 2 to 5 meters) of the access point), faced in a generally downward direction (i.e. mounted at an overhead position and looking down). The people counting sensor 102 may then be configured to count the number of people passing underneath, either to enter the room or to leave the room. In particular, the people counting sensors 102 may be configured to detect a direction of motion of persons traversing through an access point.

Each people counting sensor 102 is configured to maintain the total counts of entries (IN values) and exits (OUT values) by people via an access point associated with the people counting sensor 102. In at least some embodiments, people counting sensors 102 may be configured to store various information, including measured counts data, in one or more databases 104. For example, a people counting sensor 102 may include an internal memory which contains a database 104 that stores count values obtained using the people counting sensor 102. As a further example, a people counting sensor 102 may be communicably connected to a remote database 104 which receives and stores count values obtained from one or more of the people counting sensors 102. The database 104 may include information indicating, for each of a plurality of people counting sensors 102, one or more of: location of the people counting sensor; description of the access point associated with the people counting sensor; a type and identifier of the network to which the people counting sensor is connected; counts data (including a count of the total number of people entering and leaving a defined region) from the people counting sensor for specific time periods; historical calibration data, including time of last reset of the people counting sensor, elapsed time since last reset of the people counting sensor, number of polled time intervals since last reset of the people counting sensor, etc.

The system 100 also includes a controller 110. The controller 110 is configured to poll for and collect measurement data from the people counting sensors 102 and calculate normalized occupancy for one or more defined regions in the building 101. The controller 110 is connected to the people counting sensors 102 via the network 10. In at least some embodiments, the controller 110 may administer, monitor, and/or control the people counting sensors 102, and the people counting sensors 102 may be configured to receive and execute commands transmitted by the controller 110. For example, the controller 110 may be enabled to, for each of the one or more people counting sensors 102, configure and update device settings over-the-air, enforce compliance policies, and/or remotely deploy instructions. As will be explained below, the controller 110 may also be configured to convert normalized occupancy into data points which can be communicated as input to one or more distributed control systems, such as a building automation system.

The controller 110 may be implemented as a stand-alone device that is connected to the network 10 or as part of a remote server, such as a collection of one or more server computers. The controller 110 may include a memory 41, a processing unit 42, and a communication subsystem 43. The processing unit 42 may include a single processor with multiple cores or multiple processors (with single or multiple cores). In some embodiments, the memory 41 may store device information for one or more of the people counting sensors 102 and their associated locations within the building 101. For example, the memory 41 may contain a database 45 of connected people counting sensors 102 in the building 101. For a connected people counting sensor 102, the database 45 may indicate one or more of: device identifier (e.g. serial number, unique ID, etc.); current location in the building 101; the defined region(s) associated with the people counting sensor 102; previous groupings of people counting sensors in which the people counting sensor 102 was included; and historical calibration data for the people counting sensor 102.

In some embodiments, the controller 110 may be configured to receive input via one or more input interfaces 48. For example, the controller 110 may include a plurality of control buttons, a keypad, and/or a touch-sensitive overlay associated with a touchscreen display. The controller 110 may also be configured to send and receive communication from building automation and control systems, using communications protocols such as BACnet, Modbus, or LonWorks. For example, the controller 110 may receive queries for information from various systems that control HVAC (heating, ventilation and air conditioning), lighting, and/or space access. In particular, the controller 110 is configured to receive requests to determine occupancy of one or more defined regions in the building 101 during a plurality of specified time periods. A building 101 may be provided with a single controller 110 or multiple controllers 110. For example, a building 101 may have a main controller coupled to a sub-network of controllers, where the sub-network may comprise one or more controllers for each of a plurality of floors/levels, zones, etc. of the building 101. Alternatively, in some embodiments, the building 101 may have a plurality of controllers 110, each of which is communicably connected to a single main backend server.

Figure 2:
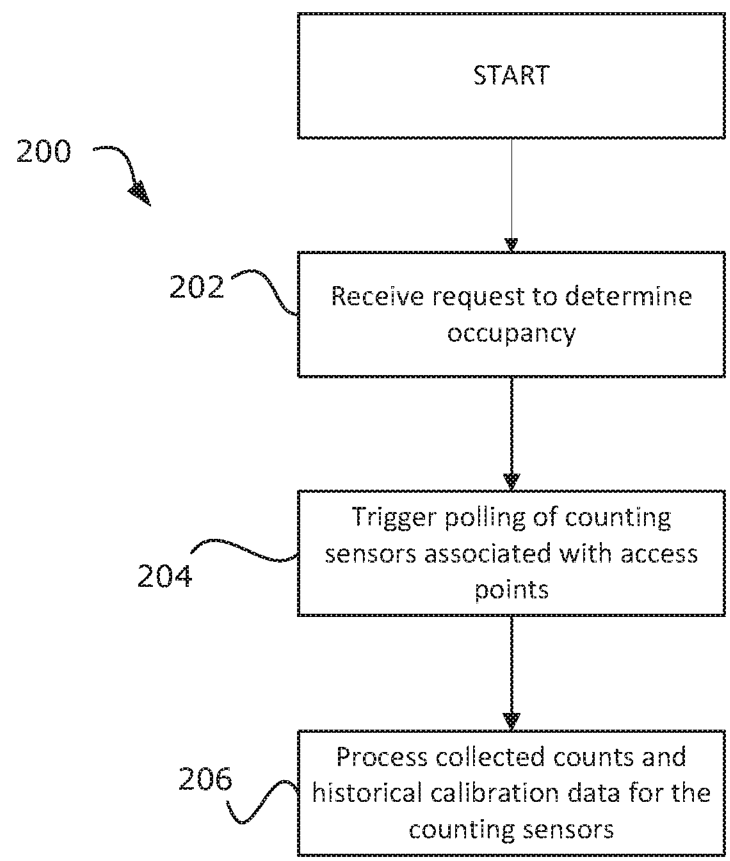
FIG. 2 shows, in flowchart form, an example method for determining normalized occupancy of a space in a building, in accordance with example embodiments of the present disclosure.

Reference is now made to FIG. 2, which shows an example method 200 for determining occupancy of a defined region in a building. In some embodiments, the method 200 may be implemented, at least in part, by an occupancy controller, such as controller 110 of FIG. 1. In operation 202, the controller receives a request to determine occupancy of a defined region of the building during a specified time period. The request may be sent from a remote source, such as a space management scheduler or building administrator, to obtain real-time occupancy data. For example, the request may be transmitted from a remote server, computing device, etc. that is connected to the controller. The request may also be received directly via a user interface, such as a display screen, associated with the controller. The time period specified in the request may be a certain time interval in the past/future, or a fixed point in time in the past/future. Acceptable time periods (e.g. date/time ranges) for requests will depend on the availability of counts data from the people counting sensors that are monitored by the controller during those time periods. In response to receiving the request, in operation 204, the controller polls one or more people counting sensors associated with access points to the defined region to obtain counts data from the one or more people counting sensors for the specified time period and historical calibration data for the one or more people counting sensors. In some embodiments, the people counting sensors associated with all of the access points to the defined region may be polled. In other words, the counts of all entries into and exits from the defined region may be compiled. For example, one or more databases associated with the people counting sensors for all of the access points to the defined region may be queried, in real-time, to obtain counts and historical calibration data for the people counting sensors.

In at least some embodiments, the controller may be configured to continuously monitor occupancy of a defined region of a building based on data from people counting sensors associated with the defined region. In particular, the controller may maintain normalized occupancy data for one or more defined regions of a building on an ongoing basis, without receiving express requests to determine occupancy. For example, normalized occupancy of a defined region may be determined in real-time by accessing a database of occupancy data maintained by the controller. In such embodiments, the controller may be configured to collect counts data from the people counting sensors at predefined time intervals or at fixed times throughout a day.

When attempting to poll people counting sensors to obtain counts data, one or more of the sensors may not be properly configured or connected to the occupancy controller. In at least some embodiments, if a people counting sensor is not responsive to a polling request from the occupancy controller, an alert notification can be generated to identify a polling failure. For example, if communication with a people counting sensor cannot be established or is lost after having been established, multiple attempts can be made to re-establish connection to the sensor. If, after a predetermined number of attempts, communication with the sensor is unsuccessful, a notification message indicating communication failure may be generated and transmitted to a backend server or administrator. Additionally, in some embodiments, an analog value object representing connection status of the people counting sensor may be published via a communications protocol such as BACnet, Modbus, or LonWorks, identifying the source of a failed communication connection.

In operation 206, the controller processes the collected counts data and the historical calibration data for the people counting sensors to determine a normalized occupancy of the defined region for the specified time period. In at least some embodiments, the normalized occupancy of the defined region is determined based, at least in part, on a model of occupancy patterns that is specific to the defined region. For example, the model of occupancy may comprise factors relating to groupings of people counting sensors for the defined region. An example method for calculating normalized occupancy is as follows:

(1) Poll cumulative IN and OUT count values from all people counting sensors of a grouping of people counting sensors for the defined region:
 (a) new_in=cumulative IN value retrieved from all sensors, for current time interval
 (b) new_out=cumulative OUT value retrieved from all sensors, for current time interval
(2) Calculate the actual IN and OUT counts from the new counts:
 (a) IN=new_in−previous_in, where previous_in corresponds to previous time interval
 (b) OUT=new_out−previous_out, where previous_out corresponds to previous time interval
(3) Set previous_in=new_in and previous_out=new_out
(4) Calculate difference between IN and OUT counts:
 (a) difference=IN−OUT
(5) Calculate occupancy: occupancy=prev_occupancy+difference
(6) Calculate normalized occupancy:
 (a) var_X=var_X+length of polling interval, where var_x represents length of time elapsed since last reset of the people counting sensors of the grouping
 (b) var_N=var_N+1, where var_N represents the number of polled intervals since last reset
 (c) var_sumX=var_sumX+var_X
 (d) var_sumY=var_sumY+occupancy, where var_sumY represents current occupancy
 (e) var_sumXY=var_sumXY+(var_X*occupancy)
 (f) var_sumX2=var_sumX2+(var_X*var_X)
 (g) var_dom=absolute(var_sumX2−(var_sumX*var_sumX)/var_N))
 (h) if var_dom>0, then
  set Y=(var_sumX−(var_sumX*var_sumX)/var_N)/var_dom
 else set Y=x, where x is a predefined value (e.g. 0.05)
 (i) normalized_occupancy=prev_normalized_occupancy+difference−Y In some other embodiments, different methods may be adapted for calculating the normalized occupancy of a defined region. The controller may also be configured to generate and/or modify a model of occupancy patterns for the defined region based on past normalized occupancy. In some embodiments, a model of occupancy patterns may be used to predict actual occupancy of a defined region for specified times or time intervals. For example, normalized occupancy data may be accumulated over a period of time in order to generate the model of occupancy patterns.

Once a normalized occupancy for a defined region is determined, it may be stored in a database containing occupancy data for a plurality of defined spaces of a building. In particular, the normalized occupancy may be saved to a database in association with an identifier of the defined region and a specific time or time interval for which the normalized occupancy is calculated. The normalized occupancy may also be published directly to a building automation and control network (e.g. via BACnet). Occupancy data may also be uploaded to a cloud-based service or a cloud platform. For example, once determined, occupancy data for one or more buildings may be pushed to, stored at, and maintained in an online server or cloud computing service, such as Microsoft Azure™.

In some embodiments, a trend log containing a record of occupancy data for a plurality of defined regions of a building may be maintained. For example, the occupancy controller may be configured to manage and update a trend log which records historical occupancy data for one or more defined regions of a building. Alternatively, trend log objects can be written directly to a building automation and control network. A trend log may usefully provide the ability to retrieve and analyze historical occupancy data for a building. For example, the occupancy controller may receive a query for occupancy data for a specific time period (e.g. date range). In response to receiving such a request, trend log objects associated with the occupancy for the selected time period may be published by the controller to the building automation and control network.

In at least some embodiments, the controller may be configured to calibrate the people counting sensors associated with the access points to the defined region in response to determining that the historical calibration data satisfy a predetermined condition. For example, if the length of time elapsed since last reset of the people counting sensors of a group of sensors for the defined region exceeds a predefined threshold, the counts value for each of the sensors of the group may be set to 0 at a suitable time (e.g. the next time that the building is closed or off-limits). As another example, if the number of polled intervals since last reset of the people counting sensors exceeds a predefined threshold, the counts value for each of the sensors of the group may be appropriately reset. The controller may also be configured to reset a people counting sensor based on the determination of the normalized occupancy of a space associated with the people counting sensor. In particular, a people counting sensor may be reset or recalibrated if the variance between occupancy and normalized occupancy exceeds a certain threshold. For example, the controller may set the occupancy to be equal to the normalized occupancy when the variance is determined to be greater than a predefined value. As a further example, a people counting sensor may be reset/recalibrated if the occupancy and normalized occupancy of a space are determined to be divergent for a period that is longer than a predefined length of time.

The controller may reset/calibrate each people counting sensor separately or reset people counting sensors in groups (e.g. reset all sensors on a floor level, etc.). If some sensors do not respond when a reset is requested, the controller may attempt reset of the sensors multiple times, with predetermined delay periods (e.g. two second delay) between the reset requests.

Figure 3:
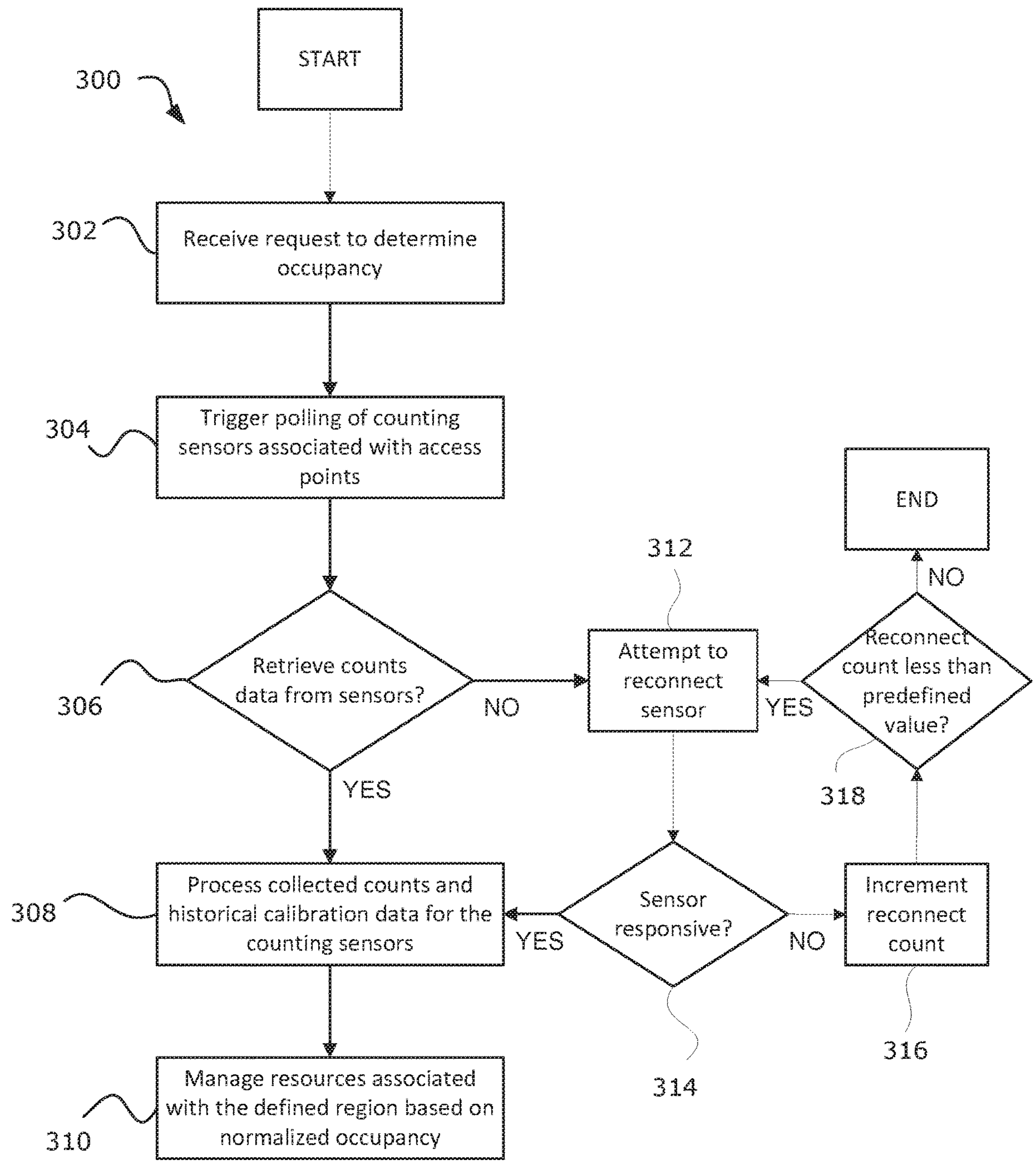
FIG. 3 shows, in flowchart form, an example method for controlling a building HVAC system, in accordance with example embodiments of the present disclosure.

Reference is now made to FIG. 3, which shows an example method 300 for controlling a building automation system (not shown). The method 300 may be implemented, at least in part, by an occupancy controller, such as controller 110 of FIG. 1, and a distributed control system that is configured to control one or more environmental conditions of a plurality of defined regions in a building. In particular, the method 300 may be employed to manage resources associated with one or more defined regions in a building.

Operations 302 and 304 correspond to operations 202 and 204 of FIG. 2, respectively, for determining a normalized occupancy of a defined region during a specified time period. In operation 306, the controller attempts to retrieve counts data from the connected people counting sensors. If successful, at step 308, the collected counts and historical calibration data for the counting sensors are processed and subsequently, at step 310, one or more resources associated with the defined region is managed based on the normalized occupancy of the defined region. The resources which may be managed for the defined region include, but are not limited to, heating, ventilation, building security, air conditioning, lighting and space access. By way of example, a demand-controlled ventilation system may regulate the volume exchange of outside air into the defined region based on levels of normalized occupancy and ventilation requirements of the defined region. In order to manage the resources, the controller may be configured to generate one or more control signals for controlling various environmental conditions of the defined region based on the normalized occupancy of the defined region. For example, control signals may be generated and transmitted, using a communications protocol such as BACnet, Modbus, or LonWorks, to one or more components of a building automation system, enabling the building automation system to trigger controls on the HVAC.

The controller may be connected to an air handling unit (AHU) of an HVAC system. A table of suggested fan speeds for a plurality of normalized occupancy values may be maintained by the controller or the building automation system. In accordance with the values indicated in such a table, the AHU can be configured to operate at the suggested fan speed corresponding to a calculated normalized occupancy for a defined region of the building. Additionally, an analog input value object representing the selected fan speed may be published to the building automation and control network (e.g. via BACnet).

If at step 306, retrieval of counts data from one or more people counting sensors fails, it may indicate that a sensor is offline, unable to communicate with the controller, and/or malfunctioning. At step 312, the controller attempts to re-establish communication with the sensor. If the sensor is unresponsive, the controller increments a reconnect count (step 316) and continues attempting to re-establish connection to the offline sensor for a predetermined number of times (step 318). If the reconnection attempts are still unsuccessful, the process 300 may proceed by excluding the disconnected sensor.

The determination of normalized occupancy may facilitate achieving other efficiencies for a building. For example, space utilization and staff (e.g. custodial) scheduling can be modified according to normalized occupancy for specific periods of time throughout a day. In particular, actual space utilization can be better understood with knowledge of normalized occupancy for one or more defined regions of a building, leading to more efficient space planning.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A system for determining normalized occupancy of one or more spaces in a building, the system comprising:

one or more sensors installed throughout the building, the one or more sensors including, for each of a plurality of defined regions in the building, at least one people counting sensor mounted at an overhead position over one or more access points to the defined region, wherein the at least one people counting sensor is configured to store, in a database, counts data including counts of entries into and exits from the defined region via a respective access point for a plurality of time periods; and a controller communicably coupled to each of the one or more sensors, the controller being configured to:

poll one or more of the people counting sensors associated with the access points to the defined regions of the building to obtain the counts data from the one or more people counting sensors for a specified time period and historical calibration data for the one or more people counting sensors, wherein the historical calibration data includes, for each of the one or more people counting sensors: time of last reset of the people counting sensor, elapsed time since last reset of the people counting sensor, and number of polled intervals since last reset of the people counting sensor;

process counts data and the historical calibration data to determine a normalized occupancy of the defined region indicating a number of people occupying the defined region during the specified time period; and calibrate the one or more people counting sensors associated with the access points to the defined region in response to determining that the historical calibration data satisfy a predetermined first condition.

2. The system of claim 1, wherein the one or more people counting sensors comprise thermal imaging sensors.

3. The system of claim 1, wherein obtaining the counts data and the historical calibration data comprises querying one or more databases associated with the one or more people counting sensors.

4. The system of claim 1, wherein the controller is further configured to generate one or more control signals for controlling an environmental condition of the defined region based on the normalized occupancy of the defined region.

5. The system of claim 1, wherein the controller is configured to determine the normalized occupancy of the defined region based, at least in part, on a model of occupancy patterns that is specific to the defined region.

6. The system of claim 1, wherein polling the one or more people counting sensors comprises polling people counting sensors associated with all of the access points to the defined region.

7. A device for determining normalized occupancy of one or more spaces in a building, the device comprising:

a memory; and a processor coupled to the memory, the processor being configured to:

poll one or more people counting sensors associated with access points to a defined region of the building to obtain counts data from the one or more people counting sensors for a specified time period and historical calibration data for the one or more people counting sensors, the one or more people counting sensors including at least one sensor mounted at an overhead position over each access point to the defined region, wherein each people counting sensor is configured to store, in a database, counts data including counts of entries into and exits from the defined region via a respective access point for a plurality of time periods, and wherein the historical calibration data includes, for each of the one or more people counting sensors: time of last reset of the people counting sensor, elapsed time since last reset of the people counting sensor, and number of polled time intervals since last reset of the people counting sensor;

process the counts data and the historical calibration data to determine a normalized occupancy of the defined region indicating a number of people occupying the defined region during the specified time period; and calibrate the one or more people counting sensors associated with the access points to the defined region in response to determining that the historical calibration data satisfy a predetermined first condition.

8. The device of claim 7, wherein the processor is further configured to generate one or more control signals for controlling an environmental condition of the defined region based on the normalized occupancy of the defined region.

9. The device of claim 8, wherein the processor is configured to generate the one or more control signals based on ventilation requirements of the defined region.

10. The device of claim 7, wherein the processor is further configured to transmit the normalized occupancy to a building automation system.

11. The device of claim 7, wherein the processor is configured to determine the normalized occupancy of the defined region based, at least in part, on a model of occupancy patterns that is specific to the defined region.

12. A method for managing resources associated with one or more spaces in a building, the method comprising:

polling one or more people counting sensors associated with access points to a defined region of the building to obtain counts data from the one or more people counting sensors for a specified time period and historical calibration data for the one or more people counting sensors, the one or more people counting sensors including at least one sensor mounted at an overhead position over each access point to the defined region, wherein each people counting sensor is configured to store, in a database, counts data including counts of entries into and exits from the defined region via a respective access point for a plurality of time periods, and wherein the historical calibration data includes, for each of the one or more people counting sensors: time of last reset of the people counting sensor, elapsed time since last reset of the people counting sensor, and number of polled time intervals since last reset of the people counting sensor;

processing the counts data and the historical calibration data to determine a normalized occupancy of the defined region indicating a number of people occupying the defined region during the specified time period;

managing resources associated with the defined region based on the normalized occupancy of the defined region; and calibrating the one or more people counting sensors associated with the access points to the defined region in response to determining that the historical calibration data satisfy a predetermined first condition.

13. The method of claim 12, wherein managing resources associated with the defined region comprises generating one or more control signals for controlling an environmental condition of the defined region based on the normalized occupancy of the defined region.

14. The method of claim 13, wherein the one or more control signals are generated based on ventilation requirements of the defined region.

15. The method of claim 12, wherein the one or more people counting sensors comprise thermal imaging sensors.

16. The method of claim 12, wherein obtaining the counts data and the historical calibration data comprises querying one or more databases associated with the one or more people counting sensors.

17. The method of claim 12, wherein the normalized occupancy of the defined region is determined based, at least in part, on a model of occupancy patterns that is specific to the defined region.

18. The method of claim 12, wherein polling the one or more people counting sensors comprises polling people counting sensors associated with all of the access points to the defined region.

* * * * *